(12) United States Patent
Sonoura et al.

(10) Patent No.: US 7,680,667 B2
(45) Date of Patent: Mar. 16, 2010

(54) INTERACTIVE ROBOT, SPEECH RECOGNITION METHOD AND COMPUTER PROGRAM PRODUCT

(75) Inventors: Takafumi Sonoura, Tokyo (JP); Kaoru Suzuki, Kanagawa (JP)

(73) Assignee: Kabuhsiki Kaisha Toshiba, TOkyo (JP)

( * ) Notice: Subject to any disclaimer, the term of this patent is extended or adjusted under 35 U.S.C. 154(b) by 1120 days.

(21) Appl. No.: 11/311,429

(22) Filed: Dec. 20, 2005

(65) Prior Publication Data

US 2006/0143017 A1    Jun. 29, 2006

(30) Foreign Application Priority Data

Dec. 24, 2004    (JP) .............................. 2004-374946

(51) Int. Cl.
*G10L 15/00* (2006.01)
*G10L 21/00* (2006.01)
*G05B 19/19* (2006.01)
*B25J 5/00* (2006.01)
*B25J 9/18* (2006.01)

(52) U.S. Cl. .................. 704/270; 704/231; 318/568.11; 318/568.12

(58) Field of Classification Search ................ 704/231, 704/270; 318/568.11–12
See application file for complete search history.

(56) References Cited

U.S. PATENT DOCUMENTS

| | | | | |
|---|---|---|---|---|
| 4,932,063 A | * | 6/1990 | Nakamura | 381/94.7 |
| 5,638,487 A | * | 6/1997 | Chigier | 704/253 |
| 5,774,841 A | * | 6/1998 | Salazar et al. | 704/225 |
| 6,098,040 A | * | 8/2000 | Petroni et al. | 704/234 |
| 2002/0048376 A1 | * | 4/2002 | Ukita | 381/92 |
| 2002/0158599 A1 | * | 10/2002 | Fujita et al. | 318/568.11 |
| 2003/0093273 A1 | | 5/2003 | Koyanagi | |
| 2003/0177006 A1 | * | 9/2003 | Ichikawa et al. | 704/231 |
| 2004/0054531 A1 | * | 3/2004 | Asano | 704/231 |
| 2004/0104702 A1 | * | 6/2004 | Nakadai et al. | 318/568.12 |
| 2005/0004710 A1 | | 1/2005 | Shimomura et al. | |

FOREIGN PATENT DOCUMENTS

| | | |
|---|---|---|
| JP | 2000-099722 | 4/2000 |
| JP | 2001-100800 | 4/2001 |
| JP | 2001-162573 | 6/2001 |
| JP | 2001-296883 | 10/2001 |
| JP | 2001-308730 | 11/2001 |

(Continued)

OTHER PUBLICATIONS

Office Action dated Jun. 24, 2008 in Japanese Application No. 2004-374946 and English-language translation thereof.
Office Action dated Oct. 23, 2007 (with partial translation).

*Primary Examiner*—David R Hudspeth
*Assistant Examiner*—Justin W Rider
(74) *Attorney, Agent, or Firm*—Nixon & Vanderhye, PC

(57) ABSTRACT

An interactive robot capable of speech recognition includes a sound-source-direction estimating unit that estimates a direction of a sound source for target voices which are required to undergo speech recognition; a moving unit that moves the interactive robot in the sound-source direction; a target-voice acquiring unit that acquires the target voices at a position after moving; and a speech recognizing unit that performs speech recognition of the target voices.

15 Claims, 15 Drawing Sheets

FOREIGN PATENT DOCUMENTS

| | | |
|---|---|---|
| JP | 2001-312292 | 11/2001 |
| JP | 2003-195886 | 7/2003 |
| JP | 2003-255989 | 9/2003 |
| JP | 2003-266348 | 9/2003 |
| JP | 2004-230480 | 8/2004 |
| JP | 2004-283927 | 10/2004 |
| JP | 2004-283959 | 10/2004 |
| JP | 2005-049153 | 2/2005 |

* cited by examiner

PLANE WAVE (Mi)

PLANE WAVE (Mj)

ARRIVAL TIME DIFFERENCE Δtij

DIRECTION OF SOUND SOURCE

WAVE FRONT (PLANE WAVE)

ΔLij

| INSTRUCTION PHRASE | CONTENT OF INSTRUCTION |
|---|---|
| MOVE RIGHT | INSTRUCTION OBJECT: WHEELS FOR MOVING<br>EXECUTION CONTENT: MOVING<br>MOVING DIRECTION: RIGHT |
| ⋮ | ⋮ |

FIG.18

| | SIGNAL-TO-NOISE RATIO | |
|---|---|---|
| | EQUAL TO OR LARGER THAN THRESHOLD | SMALLER THAN THRESHOLD |
| MOUTH MOVEMENT — DETECTED | TO S114 | TO S116 |
| MOUTH MOVEMENT — NOT DETECTED | TO S116 | TO S110 |

FIG.19

| | SPEECH RECOGNITION | |
|---|---|---|
| | SUCCESS | FAILURE |
| MOUTH MOVEMENT — DETECTED | TO S134 | TO S116 |
| MOUTH MOVEMENT — NOT DETECTED | TO S116 | TO S110 |

INTERACTIVE ROBOT, SPEECH RECOGNITION METHOD AND COMPUTER PROGRAM PRODUCT

CROSS-REFERENCE TO RELATED APPLICATIONS

This application is based upon and claims the benefit of priority from the prior Japanese Patent Application No. 2004-374946, filed on Dec. 24, 2004; the entire contents of which are incorporated herein by reference.

BACKGROUND OF THE INVENTION

1. Field of the Invention

The present invention relates to an interactive robot capable of speech recognition, and a speech recognition method and a speech recognition program for the interactive robot.

2. Description of the Related Art

Conventionally, a robot that vocally communicates with a human being has been known. A speech recognition function, by which voices of a human being can be accurately recognized, is required for such an interactive robot.

In order to improve the speech recognition function, a technology which improves a signal-to-noise ratio has been developed. For example, a small number (usually, two) of microphones are used, and, moreover, two main and sub beam formers are also used. Further, there has been known a method (refer to, for example, Japanese Patent Application Laid-Open No. 2001-100800) in which noise components in directions except the target direction are estimated with the beam former, and the noise components are subtracted from the voices with voices in the target direction, which have been obtained through main beam former as a principal component. Thereby, the noises in the directions other than the target one can be positively suppressed.

According to the above method, the target voices are separated from the noises by signal processing, noting the difference in the incidence direction between the target voice and the noises. Accordingly, when a target sound source and a noise source are almost in the same direction as each other, it is basically impossible to separate the target voices from the noises. Unless the distance of the target sound source from a robot is enough smaller than that of the noise source, there is left a large influence of the noise.

The above problem is deeply related with a physical phenomenon that, when the strengths of voices (compression waves extending in ripples) produced by corresponding sound sources are the same as each other, the strengths of the voices which have reached a microphone vary inversely with the square of the propagation distance of each voice. That is, the relatively shorter distance of the target sound source than that of the noise source causes the signal-to-noise ratio to be more improved. The strength of a voice produced at a point, for example, 30 centimeters away and that of a voice produced at a point one meter away are different from each other by a factor of 10.

However, the strengths are different from each other by a factor of only 2.25 for cases of two meters and three meters, though the difference in the distance is one meter. That is, a shorter distance between the target sound source and the microphone causes the speech recognition to be more accurately executed. According to a method using the above fact, a microphone is brought close to the mouth of a speaker. In many of speech recognition systems mounted in, for example, personal computers, a speaker wears a headset type microphone. As described above, a signal-to-noise ratio has been improved by arranging a microphone in extremely close proximity to a sound source.

However, a speaker is required to wear a microphone at any time in the above method. In the case of an interactive robot, a microphone is built in the robot. Accordingly, when the method in which the distance between the microphone and the speaker is noted as described above is adopted for the interactive robot, the interactive robot is required to be located in the vicinity of the speaker. Accordingly, the above method is not appropriate for an interactive robot moved according to instructions of a speaker for various kinds of actions. On the other hand, a human being itself can approach an interactive robot whenever the human being produces a voice. However, it is inconvenient for a disabled person to approach the robot.

SUMMARY OF THE INVENTION

According to one aspect of the present invention, an interactive robot capable of speech recognition includes a sound-source-direction estimating unit that estimates a direction of a sound source for target voices which are required to undergo speech recognition; a moving unit that moves the interactive robot in the sound-source direction; a target-voice acquiring unit that acquires the target voices at a position after moving; and a speech recognizing unit that performs speech recognition of the target voices.

According to another aspect of the present invention, a speech recognition method for an interactive robot capable of speech recognition includes estimating a direction of the sound source of target voices which are required to undergo speech recognition; moving the interactive robot in the direction of the sound source; acquiring the target voices when the interactive robot is located at a position after moving; and performing the speech recognition of the target voices.

A computer program product according to still another aspect of the present invention causes a computer to perform the speech recognition method according to the present invention.

BRIEF DESCRIPTION OF THE DRAWINGS

FIG. 7 is a schematic view showing a data configuration of an instruction-voice DB;

FIG. 18 is a table showing processing according to a second modification; and

FIG. 19 is a table showing processing according to a third modification.

DETAILED DESCRIPTION OF THE INVENTION

Exemplary embodiments of an interactive robot, a speech recognition method for the interactive robot, and a speech recognition program for the interactive robot according to the present invention will be described in detail below with referring to the accompanying drawings. Here, the invention is not limited to the embodiments.

Figure 1:
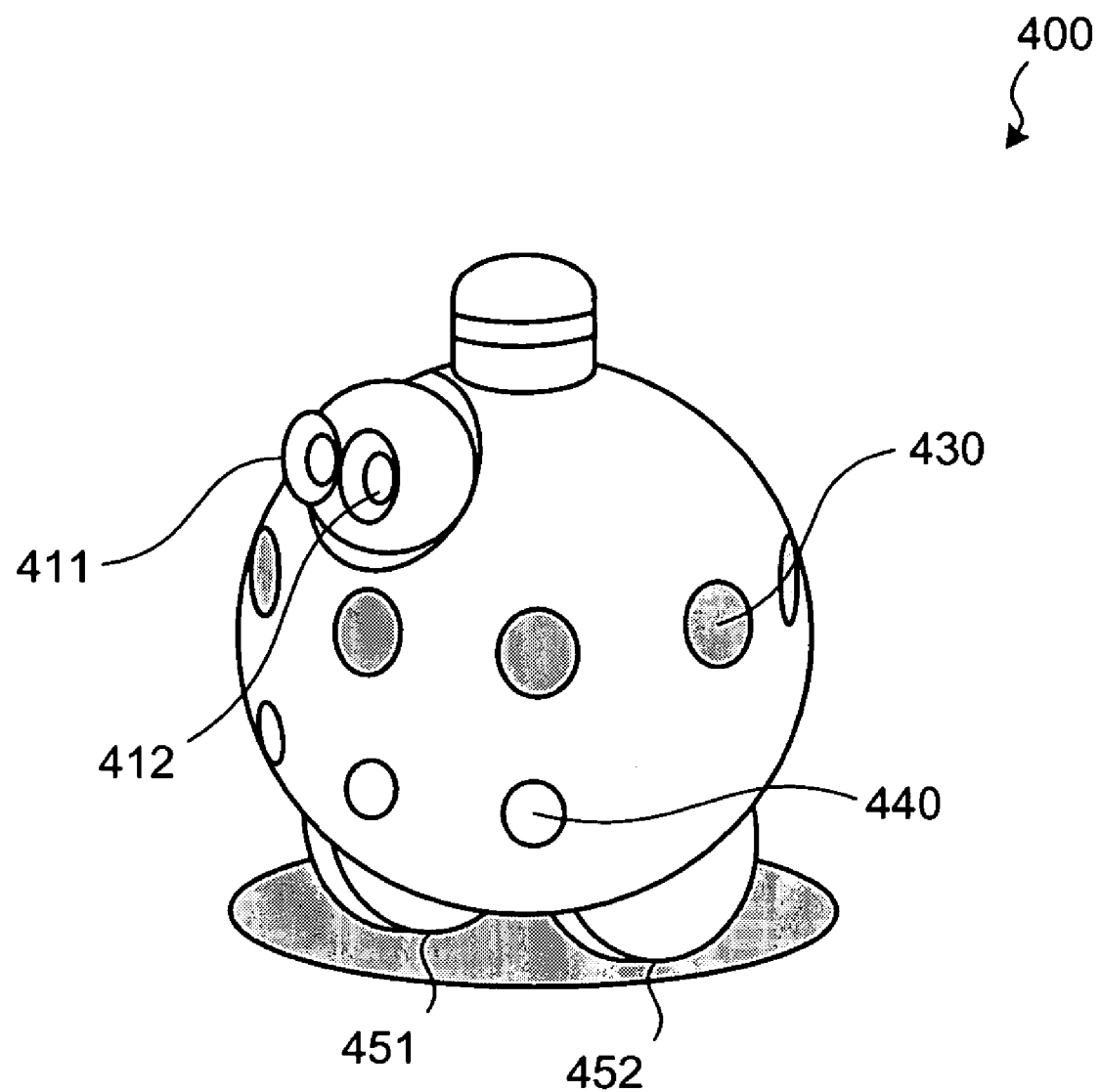
FIG. 1 is an external view of an interactive robot according to a first embodiment.

FIG. 1 is an external view of an interactive robot 400 according to a first embodiment. The interactive robot 400 recognizes the content of an instruction by speech recognition when a human being produces voices for the content of the instruction. Then, the robot executes the content of the instruction. For example, when an instruction of "move right" is given, the robot executes speech recognition of a phrase of "move right", and is actually moved to the right.

The interactive robot 400 is provided with charge-coupled-device (CCD) cameras 411 and 412, an array of microphones 430, an ultrasonic sensor 440, and wheels 451 and 452 for moving.

The microphone array 430 is an image sensor. As the two CCD cameras 411 and 412 are provided, a distance can be calculated, using stereoscopic vision.

The microphone array 430 includes a plurality of voice microphones. The receiving circuit of each voice microphone has a signal amplifying device (will be described later) using an operational amplifier with a gain adjusting function. Using the signal amplifying device, the strength of an input signal can be amplified to an appropriate value.

The ultrasonic sensor 440 is a distance measuring sensor. The sensor 440 may be a sensor by which a distance is measured, and, especially, the sensor 440 is not limited to an ultrasonic sensor. As another example, for example, a laser range finder may be used for the sensor 440.

The wheels 451 and 452 for moving are moving means for moving the interactive robot 400. Furthermore, the wheels 451 and 452 for moving can be rotated to change the moving direction. As described above, the robot 400 can autonomously move to an arbitrary position, or in an arbitrary direction by comprising the moving means.

Figure 2:
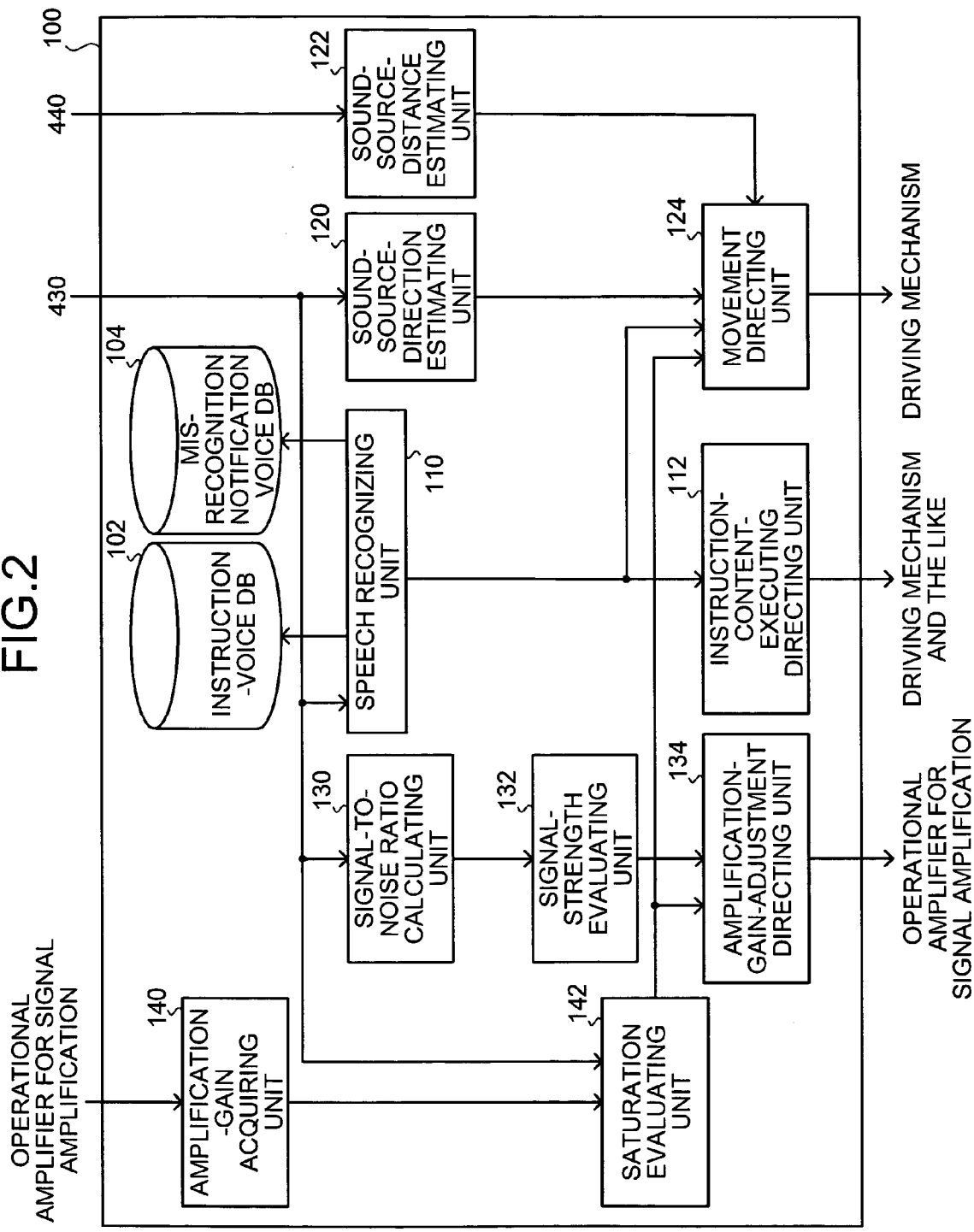
FIG. 2 is a block diagram showing a configuration for functions of a processing apparatus by which speech-recognition processing is realized as a characteristics of the interactive robot.

FIG. 2 is a block diagram showing a configuration for functions of a processing apparatus 100 by which speech-recognition processing is realized as a characteristics of the interactive robot 400.

The processing apparatus 100 includes: an instruction-voice base (DB) 102; a misrecognition-notification voice DB 104; a speech recognizing unit 110; an instruction-content-execution directing unit 112; a sound-source-direction estimating unit 120; a sound-source-distance estimating unit 122; a movement directing unit 124; a signal-to-noise ratio calculating unit 130; a signal-strength evaluating unit 132; an amplification-gain-adjustment directing unit 134; an amplification-gain acquiring unit 140; and a saturation evaluating unit 142. Here, the speech recognizing unit 110 according to the embodiment is corresponding to the target-voice acquisition means and the speech recognition means, which have been disclosed in aspects of the invention.

The instruction-voice DB 102 stores voice patters which are corresponding to the contents of instructions, wherein the instructions can be executed by the processing apparatus 100.

The misrecognition-notification voice DB 104 stores voice patterns of misrecognition-notification voices. Here, the misrecognition-notification voice means voices by which it is notified to the interactive robot 400 that there is an error in speech recognition when the robot 400 is moved to the left though a human being gives an instruction of "move right" to the robot 400. The misrecognition-notification voice DB 104 stores voice patterns for predetermined misrecognition-notification voices beforehand. Here, it is assumed that a human being communicating with the interactive robot 400 has known the misrecognition-notification voices stored in the misrecognition-notification voice DB 104.

Though the misrecognition-notification voices are not limited to predetermined voices, that is, words or phrases, it is preferable that the voices are phrases other than those which are frequently used for communication with the interactive robot 400. When, for example, phrases frequently used are used for the misrecognition-notification voices, there are easily caused cases in which the misrecognition notification phrase is included in the content of an instruction. The reason for the above case is that, though the interlocutor addresses the content of the instruction to the interactive robot 400, the robot 400 misrecognizes that the misrecognition-notification voice is included in the content of the instruction which is being addressed, and judges that misrecognition is caused.

The speech recognizing-unit 110 acquires a voice signal from the microphone array 430. Then, the speech recognizing unit 110 executes speech recognition of the acquired voice signal. More specifically, frequency analysis and pattern matching are performed for sounds picked up with the microphone array 430. The detailed technology has been described in Japanese Laid-Open Patent Application Publication No. 2003-204346. In the present embodiment, speech recognition is executed by pattern matching of the voice pattern of instruction voices, which are stored in the instruction-voice DB 102, with the voice pattern of a misrecognition-notification voices, which are stored in the misrecognition-notification voice DB 104.

The instruction-content-execution directing unit 112 directs each unit to execute the content of an instruction corresponding to instruction voices when the instruction voices stored in the instruction-voice DB 102 are obtained as a speech recognition result. For example, when the instruction voices are "move right", the instruction content execution directing unit 112 directs a driving mechanism with the wheels 451 and 452 for moving to drive the wheels.

When a human being addresses voices to the robot, the sound-source-direction estimating unit 120 estimates the direction of a sound source, based on the voices detected with the voice microphones of the microphone array 430. That is, the direction of the interlocutor is estimated.

Figure 3:
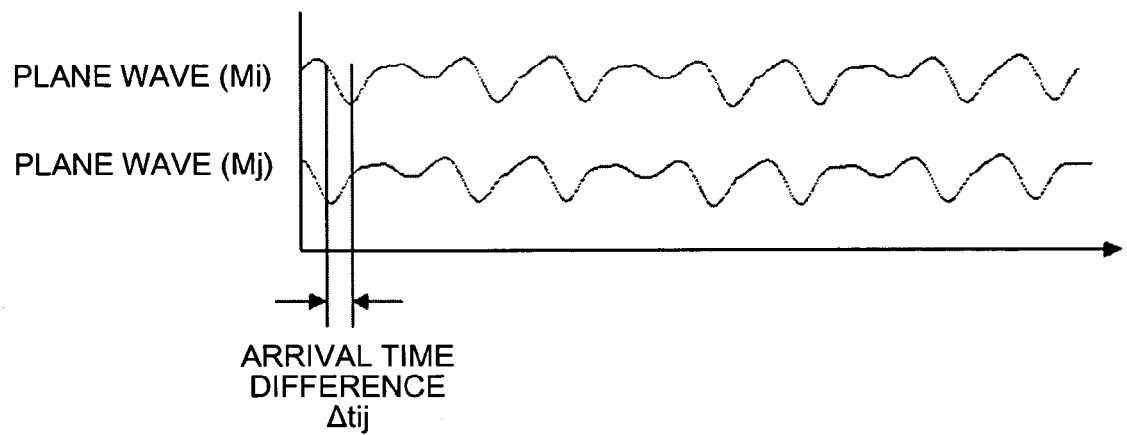
FIG. 3 is a view explaining a method which estimates the direction of a sound source, based on the detection results of a microphone array.
Figure 4:
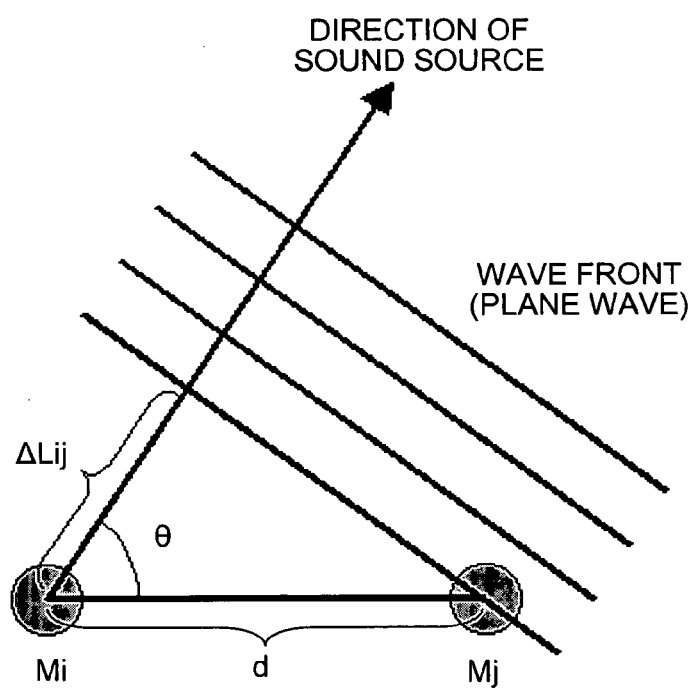
FIG. 4 is a view explaining the method which estimates the direction of the sound source, based on the detection results of the microphone array.

Referring to FIG. 3 and FIG. 4, a method, which estimates the direction of, the sound source, is explained, based on the detection result of the microphone array 430. FIG. 3 shows the signal strengths of plane waves observed with two voice microphones $M_i$ and $M_j$ in the microphone array 430. The horizontal axis of a graph represents time.

The plane waves are corresponding to the same voice signal which is sensed with the two voice microphones $M_i$ and $M_j$. Then, arrival time difference $\Delta T_{ij}$ between the plane waves $M_i$ and $M_j$ is calculated. Then, a sound-source direction $\theta$ can be calculated, based on a distance d between the two voice microphones, $M_i$ and $M_j$ and the arrival time difference $\Delta T_{ij}$. Specifically, $\theta$ is calculated by equation (1):

$$\theta = \cos^{-1}\left(\frac{V_{SW} \cdot \Delta T_{ij}}{d}\right) \quad (1)$$

where VSW denotes the speed of sound.

Here, equation (1) is obtained from the following simultaneous equations:

$$\begin{cases} \Delta L_{ij} = \Delta \cdot \cos\theta \\ \Delta L_{ij} = V_{SW} \cdot \Delta T_{ij} \end{cases} \quad (2)$$

Moreover, a potential direction component $\theta'$ in the direction of the estimated sound source is obtained from the same sound wave according to a similar technique, using another pair of voice microphones. Then, a range of the sound-source directions is limited by overlapping the candidates in the two sound-source directions. Processing by which the range of the sound-source is limited by a plurality of combinations is repeated until the range of the sound-source directions converges within a predetermined threshold. Then, the converged direction is assumed to be a sound-source direction.

As another example, the direction of the sound source may be estimated, based on a detection result with a distance measuring sensor like the ultrasonic sensor 440.

As further another example, the direction of the sound-source may be estimated, assuming that an image-forming direction is the direction of the sound source, when the images of the mouth of a human being are formed with the CCD cameras 411 and 412. Thus, the direction of the sound source may be estimated, based on signals input to various kinds of sensors provided in the interactive robot 400, and the estimating method is not limited to this embodiment.

The sound-source-distance estimating unit 122 estimates a sound-source distance which is a distance to the sound source. Specifically, the sound-source distance-is estimated, based on a detection result from the ultrasonic sensor 440. As another example, the sound-source distance may be estimated, using the stereoscopic view with the CCD cameras 411 and 412.

Directions are given by the movement directing unit 124 in such a way that the interactive robot 400 is moved. Specifically, a movement direction for moving is output to the driving mechanism with the wheels 451 and 452 for moving.

When the movement direction is sent to the driving mechanism, the driving mechanism is driven, based on the movement direction to operate the wheels 451 and 452 for moving. Thereby, the interactive robot 400 is actually moved.

The movement directing unit 124 directs the driving mechanism for moving in a predetermined case, for example, when speech recognition results in a failure though an interlocutor addresses the content of the instruction to the robot 400, The signal-to-noise ratio calculating unit 130 calculates a signal-to-noise ratio of a voice signal picked up with the microphone array 430. Here, the signal-to-noise ratio is a relative value of the signal strength of voices of an interlocutor to the signal strength of external noise. The signal-strength evaluating unit 132 compares the signal-to-noise ratio calculated in the signal-to-noise ratio calculating unit 130, and a predetermined threshold. Then, the signal strength evaluating unit 132 sends an output direction to the amplification-gain-adjustment directing unit 134. Moreover, the signal strength evaluating unit 132 sends a recognition-starting direction to the speech recognizing unit 110. It is decided according to the comparison result which of the above directions should be sent.

The amplification-gain acquiring unit 140 acquires a currently-set amplification gain from an operational amplifier for signal amplification (will be described later).

The saturation evaluating unit 142 compares the signal strength of the voices which the microphone array 430 has acquired, and a saturation strength. Now, processing of the voice signal, which has been picked up with voice microphones in the microphone array 430, is explained before the saturation strength is explained.

Figure 5:
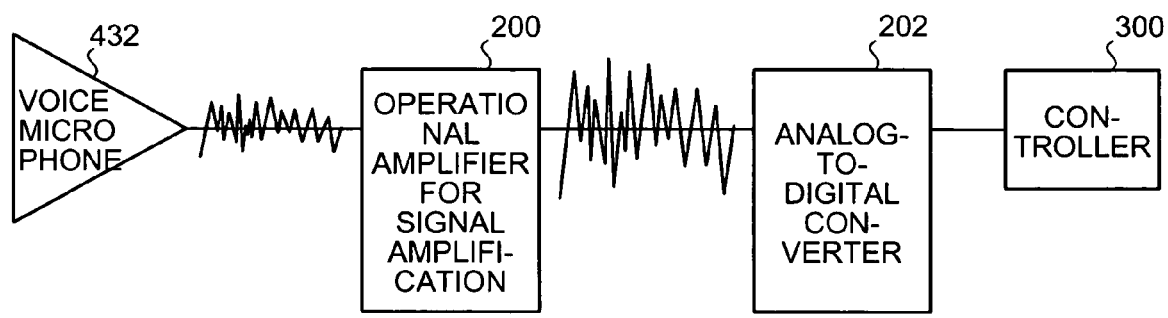
FIG. 5 is a view showing a hardware configuration for voice-signal processing, wherein the voice signal is picked up with voice microphones in the microphone array.

FIG. 5 is a view showing a hardware configuration which processes a voice-signal, wherein the voice signal is picked up with voice microphones in the microphone array 430.

The interactive robot 400 includes an operational amplifier 200 for signal amplification, an analog-to-digital converter 202, and a controller 300 in the hardware configuration for voice-signal processing.

A voice signal picked up with a voice microphone 432 in the microphone array 430 is amplified in the operational amplifier 200 for signal amplification. Analog-to-digital conversion of the voice signal amplified in the operational amplifier 200 for signal amplification is performed in the analog-to-digital converter 202. Then, the voice signal is sent as a digital signal to the controller 300. The digital signal sent to the controller 300 is used in the processing apparatus 100.

Figure 6:
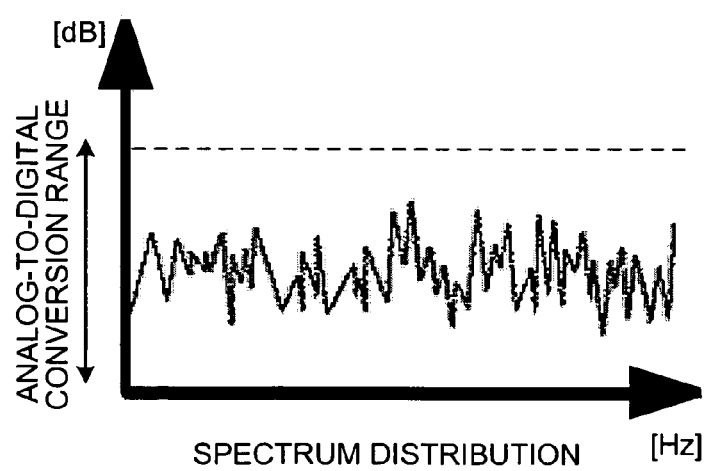
FIG. 6 is a view explaining a saturation strength.

FIG. 6 is a view explaining the saturation strength. A graph shown in FIG. 6 shows spectrum distribution and an analog-to-digital conversion range of the voice signal. When the voice signal reaches a maximum reference voltage in the analog-to-digital conversion range, the voice signal is not converted to a signal corresponding to the signal strength, and is converted to a constant value. A signal strength of a digital signal, at which the above-described saturation state is caused, is the saturation strength. That is, the maximum value in the analog-to-digital conversion range is the saturation strength.

The saturation evaluating unit 142 further acquires a current amplification gain from the amplification-gain acquiring unit 140. Then, when the signal strength is equal to, or larger than the saturation strength, an output direction is sent to the amplification-gain-adjustment directing unit 134 in order to adjust the amplification gain. Or, an output direction is sent to the movement directing unit 124 in order to move the interactive robot 400 away from an interlocutor. A current amplification gain decides which of the above directions should be sent.

FIG. 7 is a schematic view showing a data configuration of the instruction-voice DB 102. The contents of instructions which the instruction-content-execution directing unit 112 is required to direct is stored in the instruction-voice DB 102 in correspondence with a voice pattern of instruction voices representing various kinds of instructions.

Specifically, the contents of execution which is required to concretely be directed, for example, "Object to be instructed: Wheels 451 and 452 for moving, Execution content: Moving, and Moving direction: Right" is stored, for example, for a content corresponding to an instruction of "move right."

Figure 8:
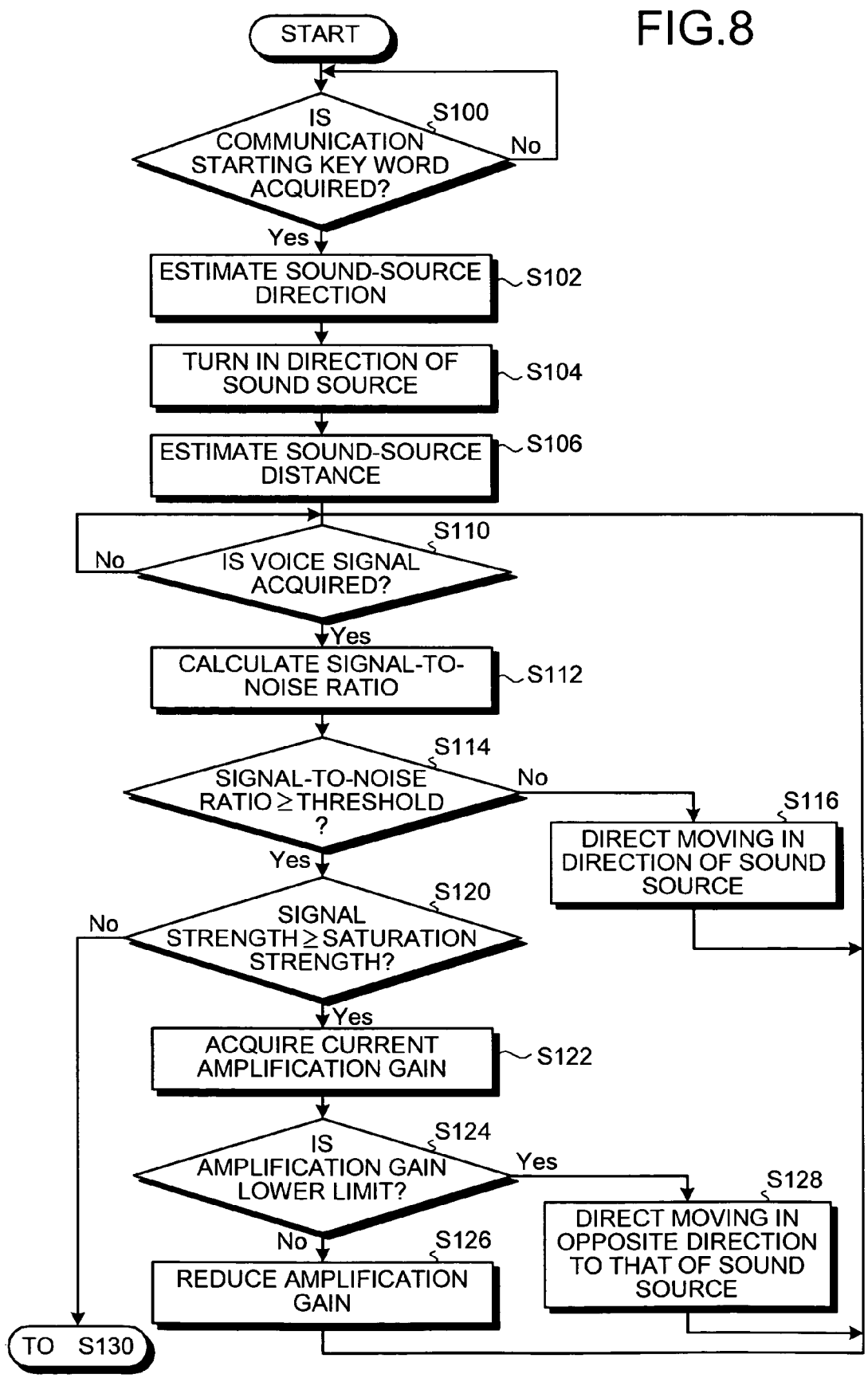
FIG. 8 is a flow chart showing processing for speech recognition in a processing apparatus.

FIG. 8 is a flow chart showing processing for speech recognition in the processing apparatus 100. The interactive robot 400 operates an engine for speech recognition at any time. Though the engine executing another operation when the robot 400 is not communicating with a person, the robot 400 executes speech recognition when a person addresses voices to the robot 400.

A communication starting key word by which communication is started is registered in the interactive robot 400 beforehand. When this communication starting key word is recognized, the robot 400 executes the contents of instructions after speech recognition of the contents of the instructions which are addressed to the robot 400.

The speech recognizing unit 110 holds, for example, a word, "Hey, Robot," as the communication starting key word. Thereafter, the instruction-voice DB 102 waits for the voice signal corresponding to the communication starting key word to be picked up with the microphone array 430.

When the microphone array 430 picks up the communication starting key word, the speech recognizing unit 110 obtains the communication starting key word of "Hey Robot" as speech recognition result. Thereby, speech recognition processing is started as a distinctive feature of this embodiment.

As described above, speech recognition of the communication starting key word is one condition on which the subsequent communication is started. Accordingly, it is preferable to use a word with less change in volume and nasal sounds for the communication starting key word. Moreover, it is preferable to use a word with an appropriate word length and high resistance to external noises for the communication starting key word. Thereby, speech recognition of the communication starting key word can be executed in an easier manner than that of general conversational speech.

In the first place, the speech recognizing unit 110 acquires the communication starting key word "Hey, Robot" after speech recognition (Yes at step S100) as shown in FIG. 8. Subsequently, the sound-source-direction estimating unit 120 estimates the direction of a sound source (step S102). Specifically, the direction of the sound source is estimated, based on detection results of voice microphones in the microphone array 430 for a voice signal "Hey, Robot."

Then, the movement directing unit 124 rotates the interactive robot 400 to turn the main body of the interactive robot 400 in the direction of the sound source (step S104), wherein the direction has been estimated by the sound-source-direction estimating unit 120. Specifically, the movement directing unit 124 outputs a rotation instruction, by which the wheels 451 and 452 for moving is rotated, to the driving mechanism for the wheels 451 and 452 for moving. According to the above information, an actual operation of rotation is executed by driving the driving mechanism for the wheels 451 and 452 for moving. The driving mechanism will be described later.

Since the interactive robot 400 according to the embodiment is provided with a plurality of voice microphones on the surroundings of the skin of the interactive robot 400, the above processing is not necessarily required. However, it is preferable, considering that the CCD cameras 411 and 412 catch images of a person, to change the directions of the CCD cameras 411 and 412 in such a way that the cameras 411 and 412 are turned in the direction of the sound source.

Subsequently, the sound-source-distance estimating unit 122 estimates the sound-source distance, based on the detection result of the ultrasonic sensor 440 (step S106). When the above-described processing is completed, voices of the interlocutor are waited for.

Then, when the instruction-voice DB 102 acquires the voice signal (Yes at step S110), the signal-to-noise ratio calculating unit 130 acquires the voice signal corresponding to the voices "Hey, Robot," and calculates the signal-to-noise ratio of the above voice signal (step S112).

Subsequently, the signal-strength evaluating unit 132 compares the signal-to-noise ratio calculated in the signal-to-noise ratio calculating unit 130, and the predetermined threshold. When the signal-to-noise ratio is smaller than the threshold (No at step S114), the signal-strength evaluating unit 132 sends an output direction to the movement directing unit 124 in order to move the interactive robot 400 in the direction of the sound source. When the movement directing unit 124 acquires the output direction, the movement directing unit 124 outputs a movement direction for moving in the direction of the sound source to the driving mechanism (step S116). When the driving mechanism acquires the movement direction, the driving mechanism drives the wheels 451 and 452 for moving. Thereby, the interactive robot 400 actually moves in the direction of the sound source. Then, the processing returns to step S110, and input of the subsequent voice signal is waited for again.

Here, a moving distance is determined, based on the sound source distance estimated in the sound-source-direction estimating unit 120. For example, a distance through which the robot travels is determined beforehand as the moving distance. If the predetermined distance is equal to or shorter than the sound source distance estimated in the sound-source-direction estimating unit 120, the robot travels only the predetermined distance. On the other hand, when the predetermined distance is larger than the sound source distance, the robot travels the sound-source distance, or a distance which is shorter than the sound-source distance by a certain value. As the robot moves in the direction of the sound source as described above, the signal-to-noise ratio can be improved.

According to this embodiment, the interactive robot 400 itself moves toward the interlocutor in order to improve the accuracy of speech recognition as described above. Thus, the interlocutor communicating with the interactive robot 400 can have more familiarity with the robot because the robot approaches the interlocutor.

According to a conventional technique, the robot requests a person to produces the voices again, or order the person to approach the robot when speech recognition for the person results in a failure. However, according to the present embodiment, a situation that the robot makes a compromise with the human being is created by making the robot itself approach a human being, and, then, by requesting the human being to produce the voices again. The above situation psychologically causes less negative impression of "commanded by the robot", and psychological effects that less dissatisfaction and less disagreeable impression with the robot are caused can be obtained.

Figure 9A:
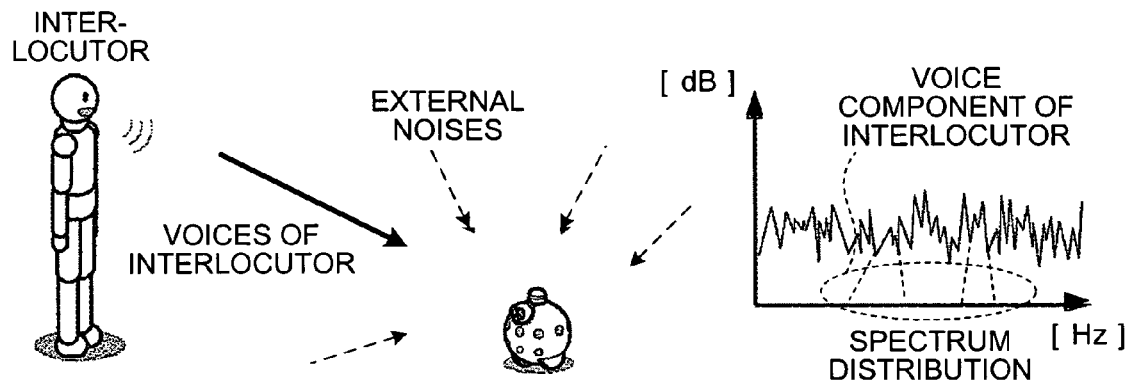
FIGS. 9A and 9B are views explaining relations between distances between an interlocutor and the interactive robot, and signal-to-noise ratios.
Figure 9B:
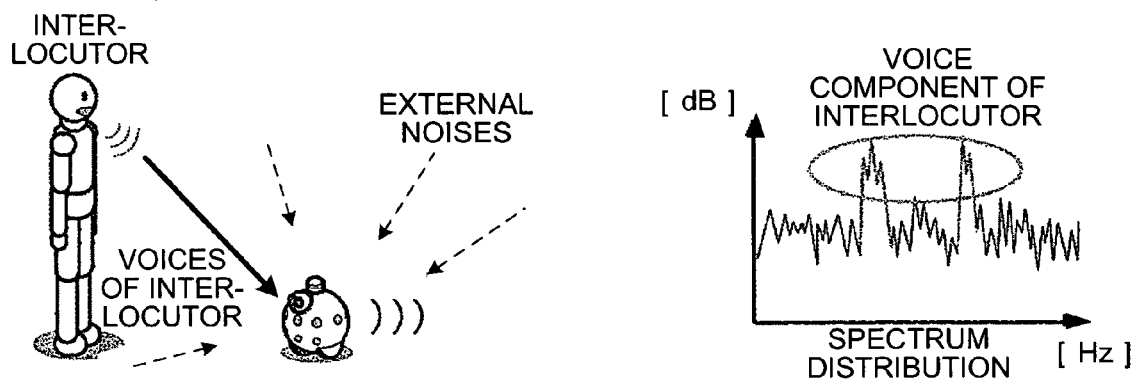

FIGS. 9A and 9B are views explaining relations between distances between an interlocutor and the interactive robot 400, and signal-to-noise ratios.

When external noises are large, voice components are buried in the external noises, as shown in FIG. 9A, though the interlocutor produces voices. Accordingly, it is difficult to separate the voice components of the interlocutor from the noises.

On the other hand, when the interactive robot 400 approaches an interlocutor, the signal strength of voice components of the interlocutor is increased as shown in FIG. 9B. Accordingly, it is easy to separate the voice components of the interlocutor from the external noises. Thus, the signal-to-noise ratio can be improved.

Figure 10A:
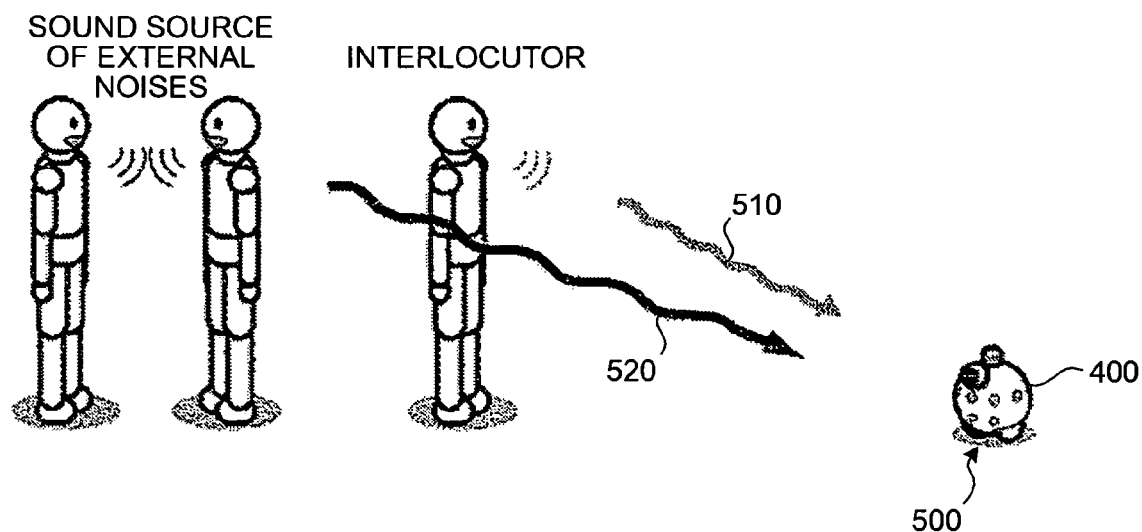
FIGS. 10A and 10B are views explaining relations between distances between the interlocutor and the interactive robot and signal-to-noise ratios when there are sound sources as external noises behind the person producing voices.
Figure 10B:
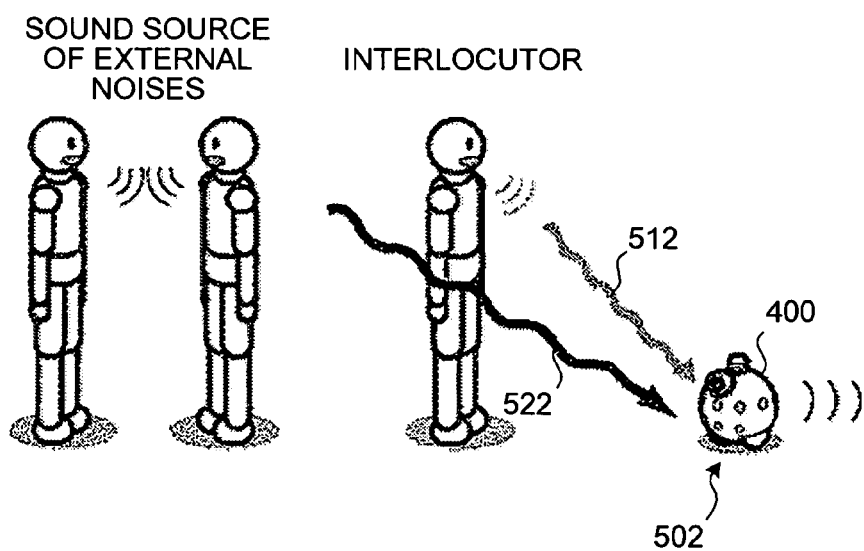
Figure 11:
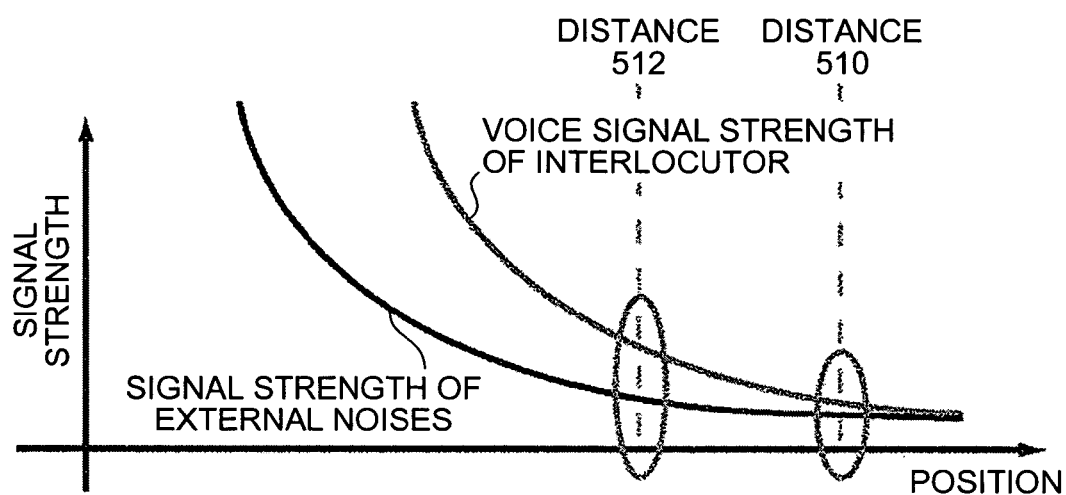
FIG. 11 is a view explaining relations between distances between the interlocutor and the interactive robot and the signal-to-noise ratios when there are sound sources as external noises behind the person producing voices.

FIGS. 10A and 10B, and FIG. 11 are views explaining relations between distances between the interlocutor and the interactive robot 400 and signal-to-noise ratios when there are sound sources as external noises behind the person producing voices. Each of FIGS. 10A and 10B shows a distance between the interlocutor and the interactive robot 400 and a distance between a sound source as an external noise and the interactive robot 400. The horizontal axis of a graph shown in FIG. 11 represents distances between the interlocutor and the interactive robot 400. The vertical axis represents the signal strength of the voice signal.

When the interactive robot 400 is located at a position 500 shown in FIG. 10A, the distance between the interactive robot 400 and the interlocutor is a distance 510. As the interactive robot 400 approaches the interlocutor when the robot 400 is moved from the position 500 shown in FIG. 10A to a position 502 shown in FIG. 10B, the distance between the interactive robot 400 and the interlocutor is a distance 512 which is shorter than the distance 510.

However, since the distance between the interactive robot 400 and the sound source of the external noise is also changed from the distance 520 to a distance 522 shorter than the distance 520 at this time, the signal strength of the external noise is also increased.

However, the strength of a sound wave is attenuated inversely with the square of the distance in the air, as shown in the graph of FIG. 11. Accordingly, when the interactive robot 400 approaches the interlocutor, the strength of a sound wave is much more influenced by a shorter distance between the interlocutor and the interactive robot 400 than by a shorter distance between the robot and the external noise. That is, the signal-to-noise ratio can be effectively improved.

Returning to FIG. 8, an explanation will be made. When the signal-to-noise ratio is equal to or larger than the threshold at step S114 (YES at step S114), the processing proceeds to step S120.

Subsequently, the saturation evaluating unit 142 compares the signal strength and the saturation one. When the signal strength is equal to or larger than the saturation strength (YES at step S120), the saturation evaluating unit 142 acquires a currently-set amplification gain from the amplification-gain acquiring unit 140 (step S122). Then, if the currently-set amplification-gain is not a lower limit of settable amplification gain (No at step S124), the amplification gain is reduced (step S126).

Thus, the signal strength can be reduced to a value equal to or smaller than the saturation strength by reducing the amplification gain. Accordingly, analog-to-digital conversion can be preferably performed.

On the other hand, when the currently-set amplification gain is the lower limit of the settable amplification gain (YES at step S124), the saturation evaluating unit 142 sends an output direction to the movement directing unit 124 in order to move the interactive robot 400 in the opposite direction to that of the sound source (step S128). When the movement directing unit 124 acquires the output direction, the movement directing unit 124 outputs a movement direction for moving in the opposite direction to that of the sound source, that is, in a direction for moving the robot away from the sound source, to the driving mechanism. Subsequently, when the driving mechanism acquires the movement direction, the driving mechanism drives the wheels 451 and 452 for moving. Thereby, the interactive robot 400 actually moves in the direction for moving the robot away from the sound source. Then, the processing returns to step S110, and input of the subsequent voice signal is waited for again.

When the interactive robot is moved away from the interlocutor even under a state in which the interlocutor addresses the content of an instruction to the robot, there is a high probability that the interlocutor has an impression of "the interlocutor is avoided." Accordingly, a disagreeable impression is given to the interlocutor to cause a high possibility that the familiarity with the robot is damaged. Then, it is configured to adjust the amplification gain as a first step when the signal strength is high as described above. Thereby, reduction in the familiarity can be prevented.

Further, when both of the voices of the interlocutor and external noises are large, it is configured to adjust the strength of the voice signal to an appropriate value by reducing the amplification gain as a first step.

Figure 12:
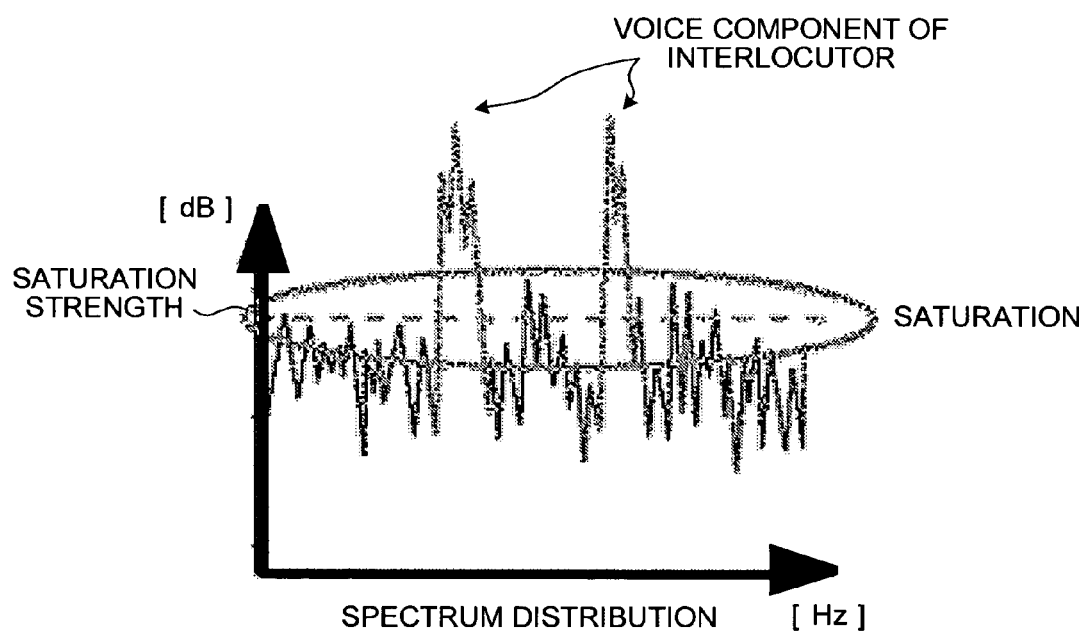
FIG. 12 is a view showing the signal strength of a voice signal for a case in which the distance between an interlocutor and the interactive robot is assumed to be T.

FIG. 12 is a view showing the signal strength of a voice signal for a case in which the distance between an interlocutor and the interactive robot 400 is assumed to be T. Here, the amplification gain at this time is G. At this time, the signal strength of the voice component in the voice signal of the interlocutor represents larger values than that of the saturation strength. Accordingly, a signal corresponding to the voice signal is not obtained in the case of analog-to-digital conversion. Then, the amplification gain is assumed to be G' in the above case. Here, G' is smaller than G. Thus, the signal strength can be reduced by reducing the amplification gain.

Figure 13:
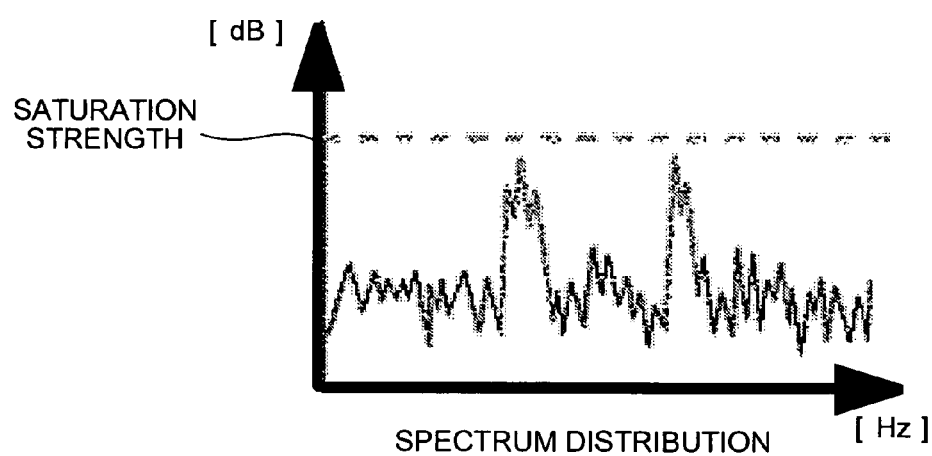
FIG. 13 is a view showing the signal strength of a voice signal for a case in which the amplification gain is assumed to be G'.

FIG. 13 is a view showing the signal strength of a voice signal for a case in which the amplification gain is assumed to be G'. Here, the distance at this time is T. The signal strengths of the voice signals are smaller than that of the saturation strength as shown in FIG. 13. Moreover, the signal strength of the external noise is also small in this case. Accordingly, the signal-to-noise ratio does not differ before and after the amplification gain is reduced.

The amplification gain is reduced, and, at analog-to-digital conversion, the signal strength is reduced to a value smaller than the saturation strength as described above to obtain a digital signal corresponding to the voice signal.

However, when the amplification gain G is a lower limit within a range of changeable amplification gains in a state shown in FIG. 12, the amplification gain cannot be reduced any further. Then, it is assumed as described above that the robot is moved in the direction for going away from the interlocutor.

Figure 14:
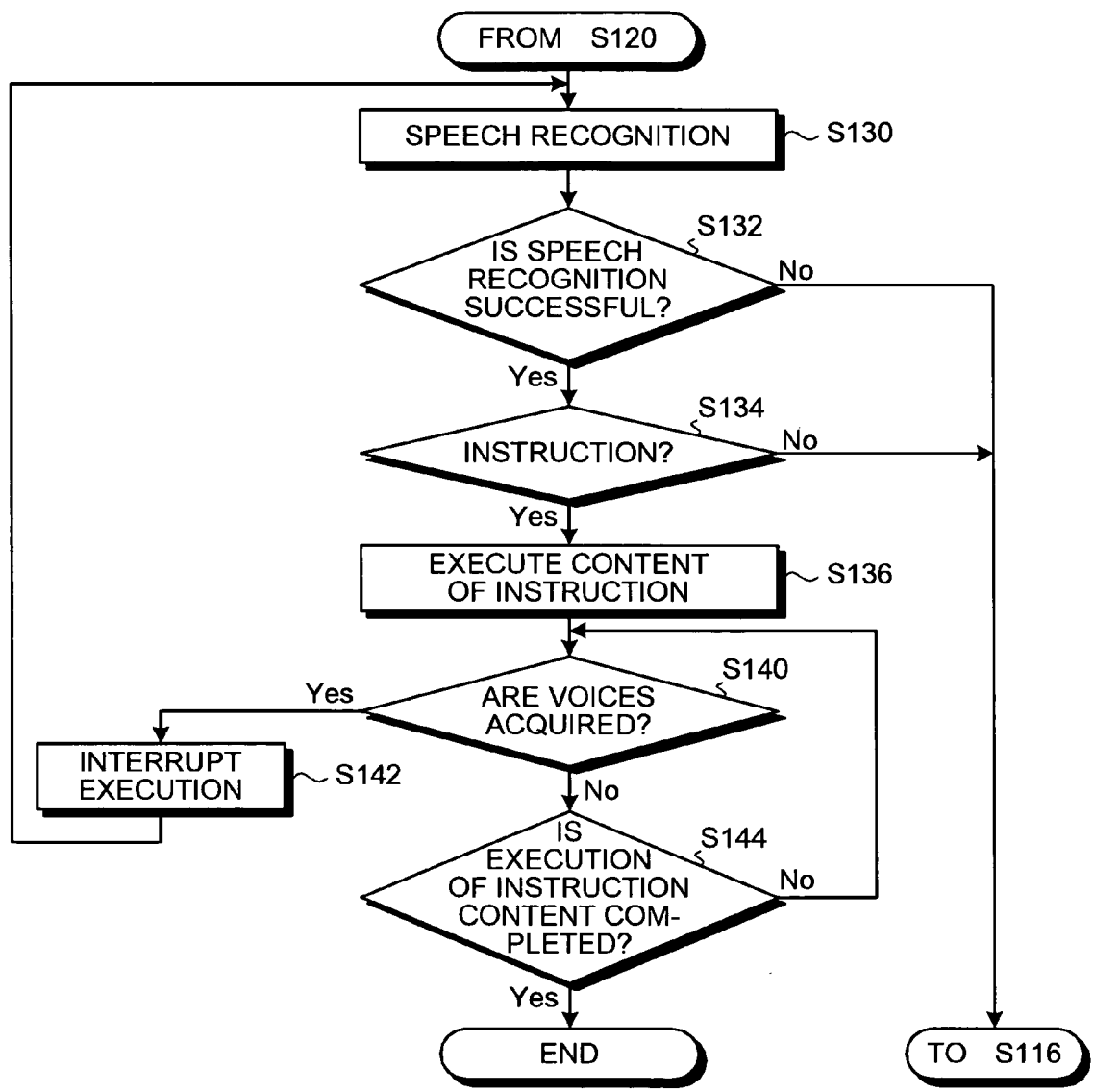
FIG. 14 is a flow chart showing processing for speech recognition in the processing apparatus.

When the signal strength is smaller than the saturation signal at step S120 shown in FIG. 8(No at step S120), the processing proceeds to step S130 shown in FIG. 14.

When the analog-to-digital signal is not saturated and the signal strength is equal to or larger than the threshold, the speech recognizing unit 110 performs speech recognition as shown in FIG. 14 (step S130). The content of voices is recognized, using, for example, the pattern matching technique.

A voice waveform extracted from an input signal, using filtering and the like for noise removal, that is, the pattern shape of the voices, and the pattern shapes of instruction voices, which have been registered in the instruction-voice DB 102 beforehand, or the pattern shapes of the voice pattern of the misrecognition-notification voices, which have been registered in the misrecognition-notification voice DB 104 beforehand are collated one by one. Then, the pattern shape with the highest agreement accuracy is recognized as the content of the produced voices. When the agreement accuracy does not exceed a certain threshold, it is assumed that the pattern shape of the input signal is in agreement with no pattern shapes of voices which have been registered. This situation means a failure in speech recognition.

When the failure in speech recognition is caused (NO at step S132), the processing proceeds to step S116. That is, the instruction-content-execution directing unit 112 sends a movement direction, by which the robot is moved in the direction of the sound source, to the movement directing unit 124. Subsequently, the movement directing unit 124 outputs a movement instruction by which the robot is moved in the direction of the sound source.

When speech recognition is successfully executed, and the result of the speech recognition is an instruction voice stored in the instruction-voice DB 102 (Yes at step S132, and Yes at step S134), the instruction-content-execution directing unit 112 outputs an direction for execution of the content of the instruction. Thereby, the content of the direction is executed (step S136).

When voices are further acquired while the content of the instruction is executed (Yes at step S140), the instruction-content-execution directing unit 112 outputs an instruction for interruption of the execution. Thereby, the execution for the content of the instruction is interrupted (step S142). Then, the processing returns to step S130, and speech recognition of the voice acquired at step S140 is performed.

When the voices are acquired while the content of the instruction is executed, there is a high possibility that the voices acquired are the misrecognition-notification voice. Then, when the voices are acquired, the content of the execution is interrupted to execute recognition processing of the content of the acquired voices. Here, the execution may be interrupted when it is judged that the acquired voices are the misrecognition-notification voice.

On the other hand, when another voice is not acquired while the content of the instruction is executed, and the execution for the content of the instruction is completed (No at step S140, and Yes at step S144), the processing of speech recognition is completed.

Moreover, when it is found according to the result of the speech recognition that the voices are not an instruction voice but the misrecognition-notification voice (No at step S134), the processing proceeds to step S116. That is, the instruction-content-execution directing unit 112 sends a movement direction that the robot is moved in the direction of the sound source to the movement directing unit 124. Then, the movement directing unit 124 outputs a movement direction by which the robot is moved in the direction of the sound source.

The speech recognizing unit 110 makes an error in speech recognition in some cases. However, the interactive robot 400 itself cannot judge that the speech recognizing unit 110 makes an error in speech recognition. Accordingly, the interactive robot 400 starts execution of the content of the instruction which has undergone the misrecognition. On the other hand, based on the starting, an interlocutor can judge that misrecognition is caused. Then, the interlocutor is configured to address the misrecognition-notification voice. If the interactive robot 400 recognizes the misrecognition-notification voice, the robot 400 can judge that the last speech recognition is a misrecognition. Preferably, the misrecognition-notification voice is a word which is repeated twice, for example, a word "error" is preferable, because the word is repeated twice like "error, error." The reason is that the misrecognition-notification voice is repeated twice and it is easy to distinguish the voice from other phrases. Another reason is that speech recognition becomes easy by simplifying the word repeated twice.

More specific processing will be further explained. There is considered, for example, a case in which sounds other than the sounds of the voices produced by a human being as an interlocutor, that is, external noises are large. In this case, a movement direction, by which the robot is moved in the direction of a sound source, is output (step S116) and the robot approaches an interlocutor when there is a small difference between the signal strength of voices produced by a human being and that of external noises, that is, when a signal-to-noise ratio is smaller than a threshold (NO at step S114). After reducing the distance between the interlocutor and the robot 400, a request for producing the voices again is output. For example, voices such as "Could you say that again?" may be output.

Specifically, for example, the interactive robot 400 is provided with a speaker, and the movement directing unit 124 sends a request for producing the voices to the speaker. The movement directing unit 124 outputs the voices, "Could you say that again?," according to the request for producing the voices. Here, the movement directing unit 124 according to the present embodiment corresponds to voice-producing direction means described as an aspect of the present invention.

Approaching an interlocutor causes the larger signal strength of a voice signal corresponding voices produced by the interlocutor. On the other hand, there is hardly any change in the signal strength of external noises. Accordingly, the relative strength of the voice signal corresponding to the voices produced by the interlocutor to the signal strength of the external noises is high. That is, the signal-to-noise ratio is reduced. Thereby, a detection rate of the voice signal corresponding to the voices produced by the interlocutor is increased. Accordingly, the efficiency of speech recognition is also improved.

Since processing is executed at this time in such a way that the signal strength is smaller than the saturation strength (steps S120 through S128), an adjustment can be done to a state in which analog-to-digital conversion can be preferably performed. Moreover, the accuracy of speech recognition can be improved because speech recognition is performed (step S130) after the signal strength is set to an appropriate value by the above-described processing.

Furthermore, a request for producing voices again is made after the robot is moved in the direction of a sound source when a failure in speech recognition or misrecognition is caused. Thereby, a voice signal corresponding to an interlocutor can be acquired in a more preferable state.

Figure 15:
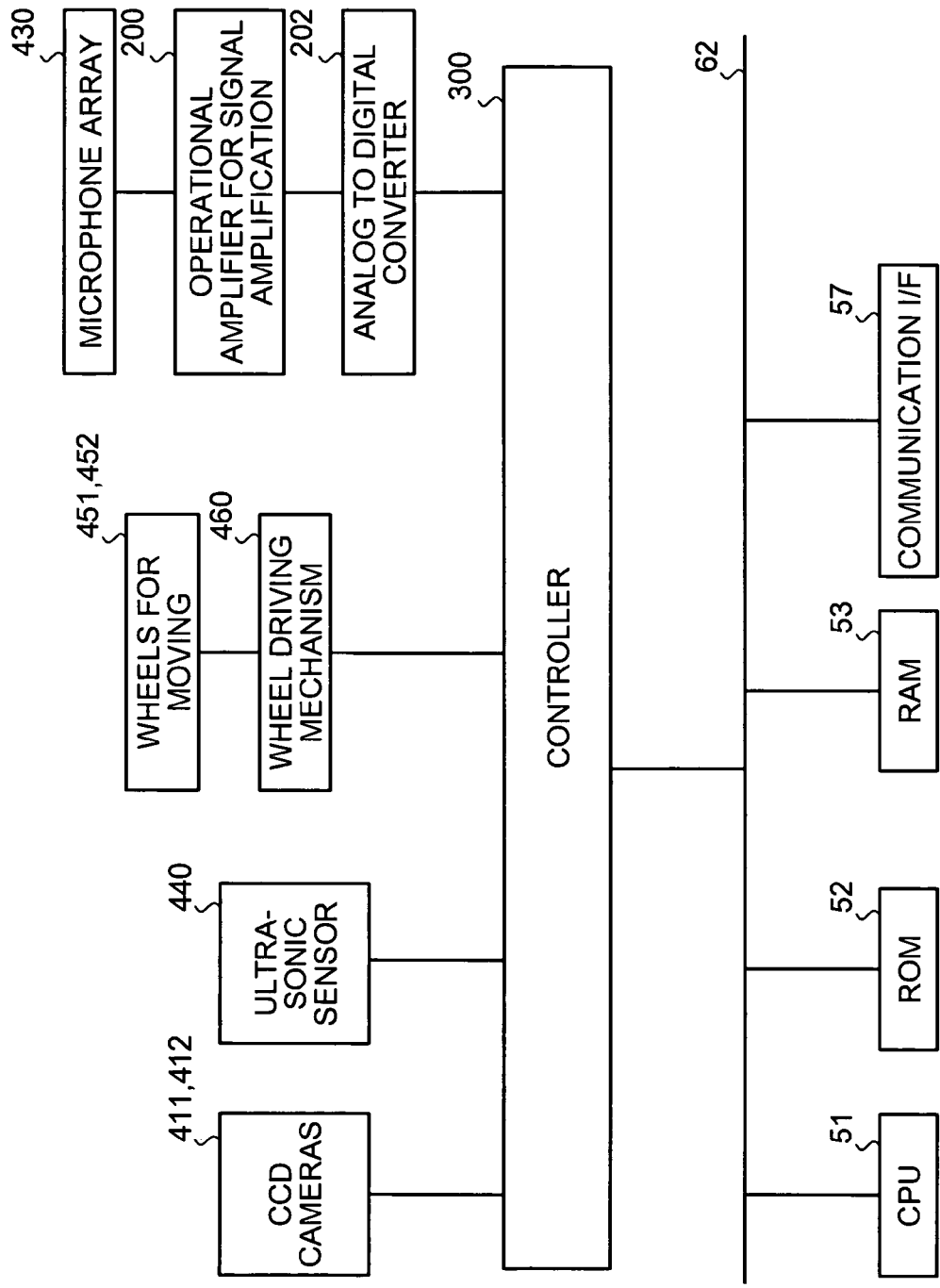
FIG. 15 is a view showing a hardware configuration of the interactive robot according to a first embodiment.

FIG. 15 is a view showing a hardware configuration of the interactive robot 400 according to the first embodiment. In the hardware configuration, the interactive robot 400 includes: a ROM 52 which stores a speech recognition program and the like for execution of speech-recognition processing in the robot 400; a CPU 51 which controls units in the robot 400 according to the programs in the ROM 52; a RAM 53 which memorizes various kinds of data required for controlling the robot 400; a communication interface (I/F) 57 connecting to a network; and a bus 62 which connects units to one another.

The above-described speech recognition program in the interactive robot 400 may be provided in such a way that the program is recorded as a file in an installable, or executable form in computer-readable recording medium such as a CD-ROM, a floppy disk (FD), a digital versatile disk and the like.

In this case, the speech recognition program is configured to be loaded in a main storage device after the program is read from the above-described recording medium and executed in the interactive robot 400, and each portion explained in the above-described software configuration is generated in the main storage device.

Moreover, the speech recognition program in this embodiment may be configured to be provided in such a way that the program is stored on a computer connected to a network on the Internet and the like and is down-loaded through the network.

The interactive robot 400 further includes as a hardware component: the above-described microphone array 430; the CCD cameras 411 and 412; the operational amplifier 200 for signal amplification; the analog-to-digital converter 202; the ultrasonic sensor 440; the wheels 451 and 452 for moving; a wheel driving mechanism 460; and the controller 300 which controls the above hardware components.

Subsequently, an interactive robot 400 according to a second embodiment is explained. The interactive robot 400 according to the second embodiment captures an interlocutor in camera images obtained by CCD cameras 411 and 412. Then, it is judged, based on the movement of the mouth of the interlocutor in the image, whether the person is producing voices. In this respect, the interactive robot 400 according to the second embodiment is different from the interactive robot 400 according to the first embodiment which judges by speech recognition whether the person is producing voices.

Figure 16:
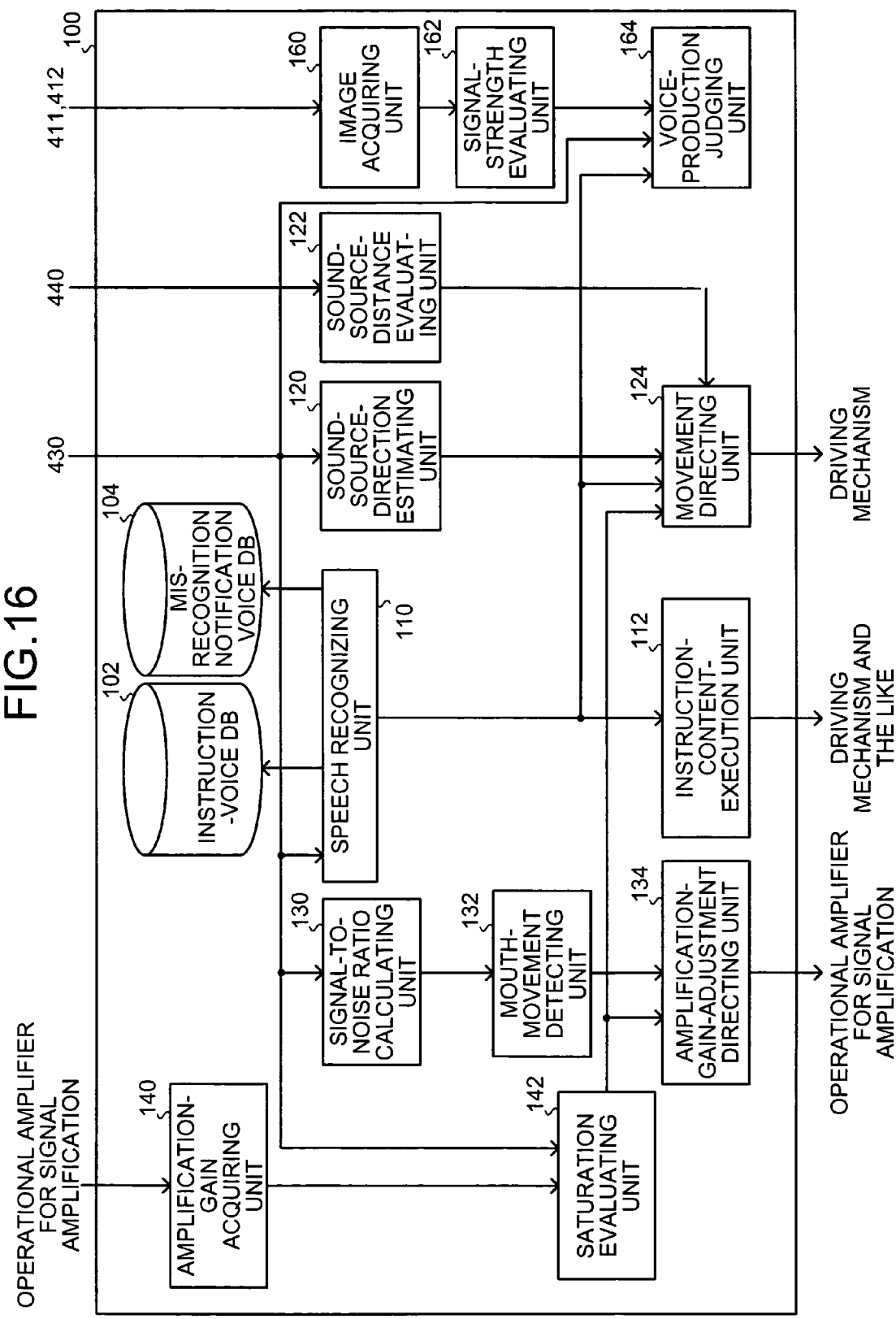
FIG. 16 is a block diagram showing a configuration for functions of a processing apparatus in the interactive robot according to a second embodiment.

FIG. 16 is a block diagram showing a configuration for functions of a processing apparatus 100 in the interactive robot 400 according to the second embodiment. The processing apparatus 100 according to the second embodiment is provided with: an image acquiring unit 160; a mouth-movement detection unit 162; and a voice-production judging unit 164, in addition to the components in the processing apparatus 100 according to the first embodiment.

The image acquiring unit 160 acquires camera images from the CCD cameras 411 and 412. The mouth-movement detection unit 162 extracts an interlocutor from a camera image acquired in the image acquiring unit 160. Furthermore, the mouth portion of the interlocutor is identified. The details of processing which identifies the mouth portion have been disclosed in Japanese Laid-Open Patent Application Publication No. 2000-99722. Then, the movement of the mouth is detected. More specifically, it is judged whether the mouth is moving. The movement of the mouth may be detected, for example, using an optical flow.

The voice-production judging unit 164 acquires, from the mouth-movement detection unit 162, judgment results on whether the mouth is moving. Further, a microphone array 430 acquires a picked-up voice signal at times when the camera images are photographed with the CCD cameras 411 and 412. The voice-production judging unit 164 sends an output direction to a movement directing unit 124, based on whether voices of the interlocutor are included in the voice signal, and whether the mouth is moving.

For example, when voices of the interlocutor are detected and speech recognition is performed even under a state in which the mouth is not moved, it is apparent that wrong speech recognition is caused. That is, it is seen that the voice signal can not have been acquired in a preferable state. Then, the content of the voices produced by the interlocutor can be more accurately recognized in the above case.

Figure 17:
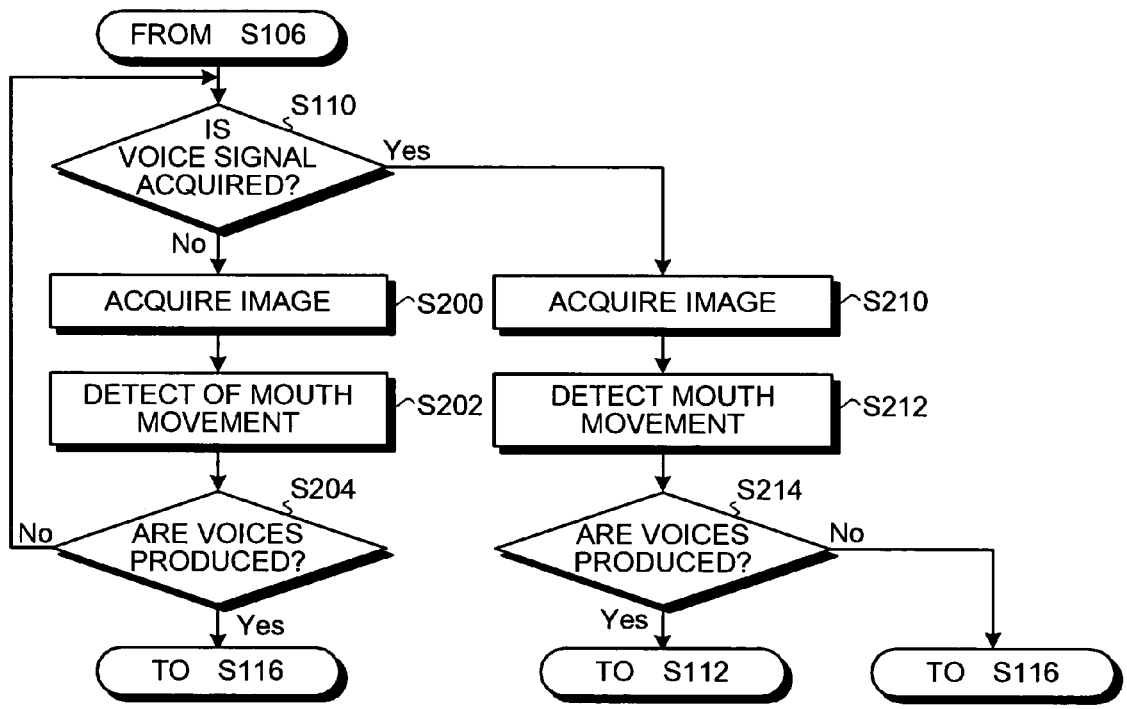
FIG. 17 is a flow chart showing a part of processing for speech recognition by the interactive robot according to the second embodiment.

FIG. 17 is a flow chart showing a part of processing for speech recognition by the interactive robot 400 according to the second embodiment. As the speech recognition processing in the interactive robot 400 according to the second embodiment is almost similar to that in the interactive robot 400 according to the first embodiment, distinctive processing in the second embodiment will hereinafter be explained.

As shown in FIG. 17, the image acquiring unit 160 regularly acquires images (step S200) even in a state in which a voice signal is not acquired and is waited for at step S110, which has been explained in the first embodiment, referring to FIG. 8. Subsequently, the mouth-movement detection unit 162 detects the mouth movement from the image which the image acquiring unit 160 has acquired (step S202). Subsequently, the voice-production judging unit 164 judges the presence or absence of produced voices, based on the detection results of the mouth-movement detection unit 162. When it is judged that there are no produced voices (No at step S204), the processing returns to step S110, and input of the subsequent voice signal is waited for.

When there is neither an acquired voice signal nor mouth movement, it can be judged that the interlocutor is not addressing any voices. In this case, the voice-production judging unit 164 judges that there is no produced voice.

On the other hand, when it is judged at step S204 that there are produced voices (Yes at step S204), the processing proceeds to step S116 shown in FIG. 8.

when the mouth movement is detected even under a state in which a voice signal has not been acquired, there is a high possibility that the voice signal is not correctly picked up. Then, voices of the interlocutor are acquired efficiently by processing at step S116.

Moreover, when a voice signal is acquired at step S110 (Yes at step S110), the image acquiring unit 160 acquires camera images formed with the CCD cameras 411 and 412 (step S210) at times when the microphone array 430 picks up the voice signal. Subsequently, the voice-production judging unit 164 detects mouth movement (step S212), and the voice-production judging unit 164 judges whether voices are produced.

When it is judged that there are produced voices (Yes at step S214), the processing proceeds to step S112 shown in FIG. 8. When a voice signal is acquired, and mouth movement is detected, it is understood that the voice signal can be correctly acquired. Accordingly, the processing proceeds to the subsequent step.

On the other hand, when it is judged that there are no produced voices (No at step S214), the processing proceeds to step S116 shown in FIG. 8.

When mouth movement is not detected even under a state in which a voice signal has been acquired, there is a high possibility that external noises are acquired by mistake as voices produced by the interlocutor. Then, voices of the interlocutor are acquired with good accuracy by processing at step S116.

Thus, the interactive robot 400 according to the second embodiment can judge, based on camera images acquired by the CCD cameras 411 and 412, whether voice signals has been exactly acquired. Moreover, it can be judged, based on the above judgment result, whether the interactive robot 400 is required to be moved in the direction of the interlocutor.

Though the present invention has been explained as described, using the embodiments, various kinds of modifications, or improvements can be added to the above-described embodiments.

As a first modification, there may be applied a configuration, in which, different from that of the above embodiments, the CCD cameras 411 and 412 regularly form images of an interlocutor, and mouth movement is detected in the images, though speech recognition of the communication starting key word has been a condition, by which processing is started, in the above embodiments.

Further, as a second modification, there may be applied a configuration, in which a series of processes, which have been explained in the second embodiment, referring to FIG. 17, and are provided in order to detect mouth movement (steps S200 through S204) are performed after the signal-to-noise-ratio calculation processing (step S112), which has been explained in the first embodiment, referring to FIG. 8.

FIG. 18 is a table showing processing for the above case. When the signal-to-noise ratio is equal to or larger than the threshold, and the mouth movement is detected, the processing proceeds to step S114 shown in FIG. 8. Moreover, when the signal-to-noise ratio is equal to or larger than the threshold, and the mouth movement is not detected, the processing proceeds to step S116 shown. The reason is that there is a high possibility that sounds other than the voices of the interlocutor are acquired because the mouth movement is not detected even under a state in which the signal-to-noise ratio is equal to or larger than the threshold.

When the signal-to-noise ratio is smaller than the threshold, and the mouth movement is detected, the processing proceeds to step S116 shown. The reason is that there is a high possibility that the interlocutor addresses voices because the mouth movement is detected. Moreover, when the signal-to-noise ratio is smaller than the threshold, and the mouth movement is not detected, the processing proceeds to step S110 shown. The reason is that it is possible to estimate that the interlocutor does not address voices in this case.

As described above, more appropriate processing can be performed by synthetic judgment of the signal-to-noise ratio and the mouth movement. Accordingly, speech recognition can be done with better accuracy.

Further, as a third modification, there may be applied a configuration, in which a series of processes, which have been explained in the second embodiment, referring to FIG. 17, and are provided in order to detect mouth movement (steps S200 through S204) are performed after the speech recognition processing 130, which has been explained in the first embodiment, referring to FIG. 14. FIG. 19 is a table showing processing for the above case. When the speech recognition is successful, and the mouth movement is detected, the processing proceeds to step S134 shown in FIG. 14. Moreover, when the speech recognition is successful, and the mouth movement is not detected, the processing proceeds to step S116 shown in FIG. 8. The reason is that there is a high possibility that there is caused misrecognition of other voices when the mouth movement is not detected even under a state that the speech recognition is successful.

On the other hand, when the speech recognition results in a failure, and the mouth movement is detected, the processing proceeds to step S116 shown in FIG. 8. Further, when the speech recognition results in a failure, and the mouth movement is not detected, the processing proceeds to step S110 shown in FIG. 8.

As described above, more appropriate processing can be performed by synthetic judgment of the results of the speech recognition and the mouth movement. Accordingly, speech recognition can be done with better accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interactive robot capable of speech recognition, comprising:
    a sound-source-direction estimating unit that estimates a direction of a sound source for target voices which are required to undergo speech recognition;
    a moving unit that moves the interactive robot in the sound-source direction;
    a target-voice acquiring unit that acquires the target voices at a position after moving;
    a target-voice holding unit that holds voice patterns of the target voices, the target voices including misrecognition-notification voices signifying that speech recognition by the speech recognizing unit is erroneous;
    a speech recognizing unit that performs speech recognition of the target voices by pattern matching of the voice patterns of the target voices, which are held in the target-voice holding unit, with the target voices acquired by the target-voice acquiring unit;
    a recognition-accuracy evaluating unit that calculates, as an accuracy of recognition results, an agreement accuracy between the acquired target voices and the voice patterns of the target voices held in the target-voice holding unit;
    wherein the moving unit moves the interactive robot itself in the direction of the sound source when the recognition accuracy for results of speech recognition of the target voices is smaller than a predetermined recognition-accuracy threshold and when the misrecognition-notification voices held in the target-voice holding unit are recognized.

2. The interactive robot according to claim 1, further comprising a voice-producing directing unit by which the sound source of the target voices is directed to produce voices after the robot is moved in the direction of the sound source,
    wherein the speech recognizing unit performs speech recognition of the target voices produced according to the voice-producing direction.

3. The interactive robot according to claim 1, further comprising:
    a signal-to-noise ratio calculating unit that calculates a signal-to-noise ratio of the target voices; and
    a signal-to-noise-ratio evaluating unit that compares the calculated signal-to-noise ratio and a predetermined threshold for the signal-to-noise ratio,
    wherein the moving unit moves the interactive robot itself in the direction of the sound source when the signal-to-noise ratio is smaller than the threshold for the signal-to-noise ratio.

4. The interactive robot according to claim 3, wherein the target voices are voices produced by an interlocutor communicating with the interactive robot, and
    the interactive robot further comprises
        an image acquiring unit that acquires images including the interlocutor as the sound source of the target voices; and
        a mouth-movement detecting unit that detects, from the images, mouth movement caused by voices produced by the interlocutor, wherein the moving unit moves the interactive robot itself in the direction of the sound source when the signal-to-noise ratio is smaller than the threshold for the signal-to-noise ratio, and the mouth movement of the interlocutor is detected.

5. The interactive robot according to claim 3, wherein the target voices are voices produced by an interlocutor communicating with the interactive robot, and
the interactive robot further comprises
an image acquiring unit that acquires images including the interlocutor as the sound source of the target voices; and
a mouth-movement detecting unit that detects, from the images, mouth movement caused by voices produced by the interlocutor,
wherein the moving unit moves the interactive robot itself in the direction of the sound source when the signal-to-noise ratio is equal to or larger than the threshold for the signal-to-noise ratio, and the mouth movement of the interlocutor is not detected.

6. The interactive robot according to claim 1, wherein the target voices are voices produced by an interlocutor communicating with the interactive robot, and
the interactive robot further comprises
an image acquiring unit that acquires images including the interlocutor as the sound source of the target voices; and
a mouth-movement detecting unit that detects, from the images acquired in the image acquiring unit, mouth movement caused by voices produced by the interlocutor,
wherein the moving unit moves the interactive robot itself in the direction of the sound source when the recognition-accuracy is smaller than the threshold for the recognition accuracy, and the mouth movement of the interlocutor is detected.

7. The interactive robot according to claim 1, wherein the target voices are voices produced by an interlocutor communicating with the interactive robot, and
the interactive robot further comprises
an image acquiring unit that acquires images including the interlocutor as the sound source of the target voices; and
a mouth-movement detecting unit that detects, from the images, mouth movement caused by voices produced by the interlocutor,
wherein the moving unit moves the interactive robot itself in the direction of the sound source when the recognition-accuracy is equal to or larger than the threshold for the recognition accuracy, and the mouth movement of the interlocutor is not detected.

8. The interactive robot according to claim 1, wherein the target voices are voices produced by an interlocutor communicating with the interactive robot,
the interactive robot further comprises
an image acquiring unit that acquires images including the interlocutor as the sound source of the target voices; and
a mouth-movement detecting unit that detects, from the images acquired in the image acquiring unit, mouth movement caused by voices produced by the interlocutor,
wherein the moving unit moves the interactive robot in the direction of the sound source when the mouth movement is detected and the target voices are not acquired.

9. The interactive robot according to claim 1, wherein the target voices are voices produced by an interlocutor communicating with the interactive robot, and
the interactive robot further comprises
an image acquiring unit that acquires images including the interlocutor as the sound source of the target voices; and
a mouth-movement detecting unit that detects, from the images, mouth movement of the interlocutor,
wherein the moving unit moves the interactive robot in the direction of the sound source when the mouth movement is not detected and the target voices are not acquired.

10. The interactive robot according to claim 1, further comprising
a microphone array that has a plurality of microphones which pick up the target voices,
wherein the direction of the sound source is estimated, based on differential arrival time between plane waves of the target voices picked up with corresponding voice microphones.

11. The interactive robot according to claim 1, further comprising a distance measuring sensor that measures a distance between the target voices and the interactive robot,
wherein the sound-source-direction estimating unit estimates the direction of the sound source, based on measured results.

12. The interactive robot according to claim 1, further comprising an image forming unit that forms an image of the sound source of the target voices,
wherein the sound-source-direction estimating unit estimates the direction of the sound source, assuming that an image-forming direction is the direction of the sound source.

13. The interactive robot according to claim 1, further comprising:
a signal-strength measurement unit that measures signal strength of the target voices at a position after the interactive robot is moved by the moving unit; and
an amplification-gain-adjustment unit that, based on the value of the signal strength, adjusts a gain of amplification by which voice signal of the target voices is amplified,
wherein the speech recognizing unit performs speech recognition of the target voices acquired after the gain of amplification is adjusted.

14. A computer-implemented method for an interactive robot capable of speech recognition, the method comprising:
estimating a direction of the sound source of target voices which are required to undergo speech recognition;
moving the interactive robot in the direction of the sound source;
acquiring the target voices when the interactive robot is located at a position after moving;
performing speech recognition of the target voices by pattern matching of voice patterns of the target voices, which are held in a target-voice holding unit, with the acquired target voices, where the target voices held in the target-voice holding unit include misrecognition-notification voices signifying that speech recognition is erroneous;
calculating, as an accuracy of recognition results, an agreement accuracy between the acquired target voices and the voice patterns of the target voices held in the target-voice holding unit; and
moving the interactive robot itself in the direction of the sound source when the recognition accuracy for results of speech recognition of the target voices is smaller than a predetermined recognition-accuracy threshold and when the misrecognition-notification voices held in the target-voice holding unit are recognized.

15. A computer program product having a computer readable medium including programmed instructions for performing speech recognition processing on an interactive robot capable of speech recognition, wherein the instructions, when executed by a computer, cause the computer to perform:

estimating a direction of the sound source of target voices which are required to undergo speech recognition;

moving the interactive robot in the direction of the sound source;

acquiring the target voices when the interactive robot is located at a position after moving;

performing speech recognition of the target voices by pattern matching of voice patterns of the target voices, which are held in a target-voice holding unit, with the acquired target voices, where the target voices held in the target-voice holding unit include misrecognition-notification voices signifying that speech recognition is erroneous;

calculating, as an accuracy of recognition result, an agreement accuracy between the acquired target voices and the voice patterns of the target voices held in the target-voice holding unit; and moving the interactive robot itself in the direction of the sound source when the recognition accuracy for results of speech recognition of the target voices is smaller than a predetermined recognition-accuracy threshold and when the misrecognition-notification voices held in the target-voice holding unit are recognized.

* * * * *

UNITED STATES PATENT AND TRADEMARK OFFICE
CERTIFICATE OF CORRECTION

PATENT NO. : 7,680,667 B2
APPLICATION NO. : 11/311429
DATED : March 16, 2010
INVENTOR(S) : Sonoura et al.

It is certified that error appears in the above-identified patent and that said Letters Patent is hereby corrected as shown below:

On the Title Page
Item "(73) Assignee
 Kabuhsiki Kaisha Toshiba, Tokyo (JP)"

should be:

Item --(73) Assignee
 Kabushiki Kaisha Toshiba, Tokyo (JP)--

Signed and Sealed this

Eleventh Day of May, 2010

David J. Kappos
*Director of the United States Patent and Trademark Office*